(12) United States Patent
Dutta et al.

(10) Patent No.: US 7,793,300 B2
(45) Date of Patent: *Sep. 7, 2010

(54) SYSTEM AND METHOD FOR ABSTRACTING STATE TRANSITIONS WITHOUT REQUIRING CLIENT KNOWLEDGE

(75) Inventors: Tanmoy Dutta, Redmond, WA (US); Jeremy Mazner, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1297 days.

This patent is subject to a terminal disclaimer.

(21) Appl. No.: 11/174,243

(22) Filed: Jul. 1, 2005

(65) Prior Publication Data

US 2005/0246315 A1  Nov. 3, 2005

Related U.S. Application Data

(63) Continuation of application No. 09/677,443, filed on Sep. 29, 2000, now Pat. No. 6,976,259.

(51) Int. Cl.
*G06F 3/00* (2006.01)
*G06F 15/16* (2006.01)

(52) U.S. Cl. .................. 719/310; 715/700; 709/227

(58) Field of Classification Search .......... 719/310; 715/200, 700; 709/227
See application file for complete search history.

(56) References Cited

U.S. PATENT DOCUMENTS

| 5,390,328 | A | | 2/1995 | Frey et al. ............... 395/650 |
|---|---|---|---|---|
| 5,652,714 | A | * | 7/1997 | Peterson et al. ............ 702/57 |
| 5,826,242 | A | | 10/1998 | Montulli ................... 705/27 |
| 5,930,792 | A | * | 7/1999 | Polcyn ..................... 707/9 |
| 6,182,092 | B1 | | 1/2001 | Francis et al. ............ 707/513 |
| 6,418,464 | B1 | * | 7/2002 | Minow ..................... 709/203 |
| 6,976,259 | B1 | | 12/2005 | Dutta et al. ............... 719/310 |
| 7,350,151 | B1 | * | 3/2008 | Nakajima .................. 715/762 |

FOREIGN PATENT DOCUMENTS

JP  09346371  * 12/1997

OTHER PUBLICATIONS

Matthew B. Dwyer ,Model Checking Graphical User Interfaces Using Abstractions , 1996.*
Kato, Y., et al., "Method and device for expanding WWW browser function," Patent No. JP411110321A, 1999, 2 pages (Abstract).
State transition control procedure for connection www browser an server in internet-involves searching transition path to attain target condition, based on which transition of controlled object is controlled, *Derwent Information LTD*, 1999.
The State Pattern, *Pattern Depot*, 1999, pp. 1-8.

* cited by examiner

*Primary Examiner*—Lechi Truong
(74) *Attorney, Agent, or Firm*—Woodcock Washburn LLP (57) ABSTRACT

A system and method employ a client-server architecture that abstracts from the client the states of objects and transitions between the states. As a result, the server maintains objects, along with associated states, and state transitions that are provided to clients on demand. The client is only provided with a set of valid transitions between states that are based on the current state of the object and valid transitions out of that state. The states may be additionally filtered based on the permissions granted to the client. In this way, the client is relieved of prior knowledge of valid object states and state transitions. Hence, in a document management system, for example, new states and transitions for objects may be added at the server and propagated through to the clients.

16 Claims, 5 Drawing Sheets

SYSTEM AND METHOD FOR ABSTRACTING STATE TRANSITIONS WITHOUT REQUIRING CLIENT KNOWLEDGE

TECHNICAL FIELD

The present invention relates generally to systems and methods for abstracting from a client the state transitions of an object on a server. More particularly, the invention is directed to abstracting from various clients the states of an object in a knowledge management system so that the actions that the client can perform on the object are dynamically determined.

BACKGROUND OF THE INVENTION

As the amount of information stored by computer systems continues its exponential growth, companies are developing sophisticated information organization methods to aid users in both the storage and retrieval of that information. The ability to capture information, knowledge, and data has created a demand on organizations to absorb and analyze this information, knowledge, and data in a focused way. Organizations and people within organizations that effectively harness this information, knowledge, and data have a competitive advantage.

The onslaught of information has in turn changed the way in which people within organizations interact with information and collaborate in the preparation of projects. For example, the ability for people within organizations to collaborate on the preparation and review of a document has changed the way people interact allowing people to gain knowledge from their experiences and their peers' expertise. The need for effective collaboration in the preparation of documents has become essential to completion of projects. Lack of effective collaboration affects an organization's ability to meet time-to-market constraints, affects bottom line costs, and minimizes top line profitability. To achieve effective collaboration, the collaborative environment must be optimized, information feeds must be integrated wherever possible, and the right tolls must be available to visualize and disseminate information rapidly and meaningfully.

Client server environments facilitate collaboration by providing a central repository of information by way of a server that can provide a common platform for people to interact with by way of client computers. Client-server systems allow a centralized server to uniformly control aspects of the client interaction with programs and data on the server. One such example system is a document management system that provides a mechanism whereby multiple clients can collaborate in development of documents and other objects. Typically, such systems maintain objects in a central location (i.e. on a sever) and control the access to the object by multiple clients. In this way, collaboration can be coordinated so that multiple clients are not simultaneously changing the object. For example, clients can access the server and "check-out" an object. Thereafter, other clients attempting to access the object will be notified that that object is in a "checked-out" state and may be prohibited from changing the object. Additionally, clients may see other object states such as "checked-in", "expired", and so on. While the server typically maintains control over the object, access to the object is typically provided by client software. Controlling the functionality of access to the object at the server would provide uniformity across clients and provide for a more flexible system design. Hence, there is a need to provide an improved system and method for controlling the access to and the manipulation of objects in a client-server environment wherein a plurality of clients have varying access to a plurality of objects stored on the server.

SUMMARY OF THE INVENTION

To meet the above need, the present invention provides a flexible, server based system for controlling the operations on objects (i.e., the manner in which users can access and manipulate objects), particularly in a document management system. This functionality is achieved by providing a server-based state-transition model for objects in its domain. The state transition model maintains at the server allowable states for object and allowable transitions between the states. Based on that state transition model, the server can determine what operations are permitted to be performed on a given object to transition the object from its current state to a new state. Whenever a client desires to perform operations upon the object, the client makes a request to the server for currently permitted operations. In this way, clients are divorced from the complexity of the system (e.g., the document management system) and the operations that are permitted to transition a given object to a different state. This use of a state transition model provides among other advantages, uniformity of interfaces, faster system upgrades, and so on.

The system comprises a server that maintains an object or objects to be accessed by a client. The server maintains a set of states and state transitions for each object and maintains a current state of each object. When the server receives a request for an object from a client computer, the server provides to the client the object, the current state of the object, and selected state transitions. The selected state transitions are based on the current state. Thereafter, the client may only perform the state transitions to the object based on said selected state transitions provided by the server.

BRIEF DESCRIPTIONS OF THE DRAWINGS

The foregoing summary, as well as the following detailed description of the preferred embodiments, is better understood when read in conjunction with the append drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The present invention addresses the need for a system and method for managing collaborative access to objects. To that end, the system and method provide centralized control over objects and provide a platform wherein actions to be perform on an object are based on the current state of the object and valid transitions from those states. The valid states are maintained on a per object basis and can be controlled based on the permissions of the user.

Exemplary Operating Environment

The present invention is preferably deployed in a network environment, particularly where that network is an Internet or Intranet environment. The term "Internet" is an abbreviation for "Internetwork," and refers commonly to the collection of networks and gateways that utilize the TCP/IP suite of protocols, which are well-known in the art of computer networking. TCP/IP is an acronym for "Transmission Control Protocol/Internet Protocol." The Internet can be described as system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate"through related topics, regardless of the presented order of the topics. These links are often established by both the author of a hypertext document and by the user, depending on the intent of the hypertext document. For example, traveling among links to the work "iron" in an article displayed within a graphical user interface in a data-processing system might lead the user to the periodic table of the chemical elements (i.e., linked by the work "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the non-textual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well, as hypertext topics, are thus linked in manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilized hypertext and hypermedia conventions follows a client/server architecture. The "client"is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a network system, a client is usually a computer that accesses shared network resources provided by another computer (i.e., a server).

A request by a user for new can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in first computer system, and the server process may be active in a second computer system, communicating with one another over a communications medium, this providing distributed functionally and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Uniform Resource Locator (URL). The network address can be referred to as a Universal Resource Locator address. For example, communication can be provided over a communications medium. In particular, the client and server may be coupled to one another via TCP/IP connections for high-capacity communication. Active within the client is a first process, known as a "browser," which establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data. Each web page can also be referred to simply as a "page."

The client typically displays the information provided through the network by the server, using a software application known as a browser. Most browsers have modern graphical user interfaces that are capable of displaying and manipulating various types of data. A graphical user interface is a type of display format that enables a user to choose commands, start programs, and see lists of files an other options by pointing to pictorial representations (icons) and lists of menu items on the screen. Choices can be activated generally either with a keyboard or a mouse. Internet services are typically accessed by specifying a unique network address (i.e., typically with a URL). The URL address has two basic components, the protocol to be used and the object pathname. For example, the URL address, "http://www.uspto.gov" (i.e., home page for the U.S. Patent and Trademark Office), specifies a HTTP and a pathname of the server ("www.uspto.gov"). The server name is associated with one or more equivalent TCP/IP address.

Figure 1:
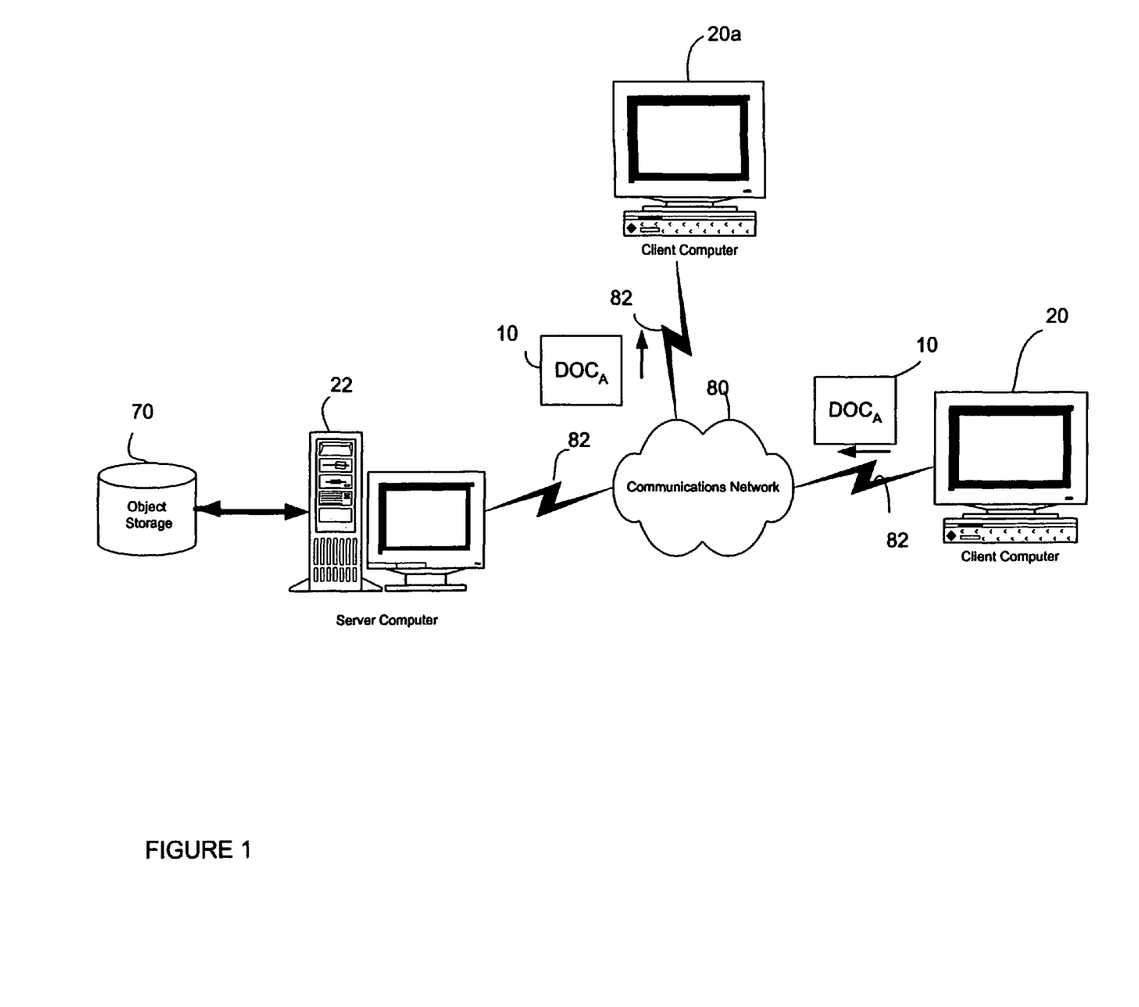
FIG. 1 is a schematic diagram representing a network computer model in which aspects of the present invention may be incorporated.

FIG. 1 illustrates and exemplary environment in which the present invention may be employed. Of course, actual environments can be arranged in a variety of configurations; however, the environment is shown here in the context of a client server system to provide a framework for understanding the type of environment in which the present invention operates. Thy system may include client computers 20, 20a, which could be personal computers, thin clients, hand-held computing devices, and so on. Additionally, the system may include a server computer 22, and storage 70, which is coupled to and controlled by server computer 22. The client and server computers communicate with each other by way of communications network 80, which may be a LAN, a WAN, intranet, the Internet, etc.

Client computers 20, 20a and server computer 22 are connected to communications network 80 by way of communications interfaces 82. Communications interfaces 82 can be any one of the well-known communications interfaces such as Ethernet connections, modem connections, DSL connections and so on. Communications interfaces 82 may also be by way of an intermediate communications network such as a LAN.

According to aspects of the present invention, users of client computers 20, 20a may generate and manipulate objects 10 (e.g., $DOC_A$) that must be stored for later retrieval for editing, viewing, and the like. The generic term user(s) is used herein to designate all users of the system; however, in practice user may be distinguished into different classes depending on his or her particular use. For example, a user may be a producer of documents (i.e., and author/editor/creator), a consumer (i.e. a reader trying to find particular documents), or both. Each user may have a different set of operations that they are authorized to perform on document 10. As used herein, the term object refers to any file that contains data and may contain text, graphics, special codes, or a combination of some or all of these. To facilitate object management, the objects generated by client computers 20, 20a are stored in object storage 70 and are thus transmitted to server computer 22 over communications network 80. Server computer 22 then determines the proper storage of the objects in object storage 70.

In addition to the generation of objects, users of client computers 20, 20a may also desire to share objects with other users, e.g., to collaborate on the object development. In order to retrieve objects generated by other users, users make requests to server computer 22 for documents stored in object storage 70. Server computer 22 then retrieves the requested documents and transmits them back to the requesting user's client computer 20, 20a by way of communications network 80.

Figure 2:
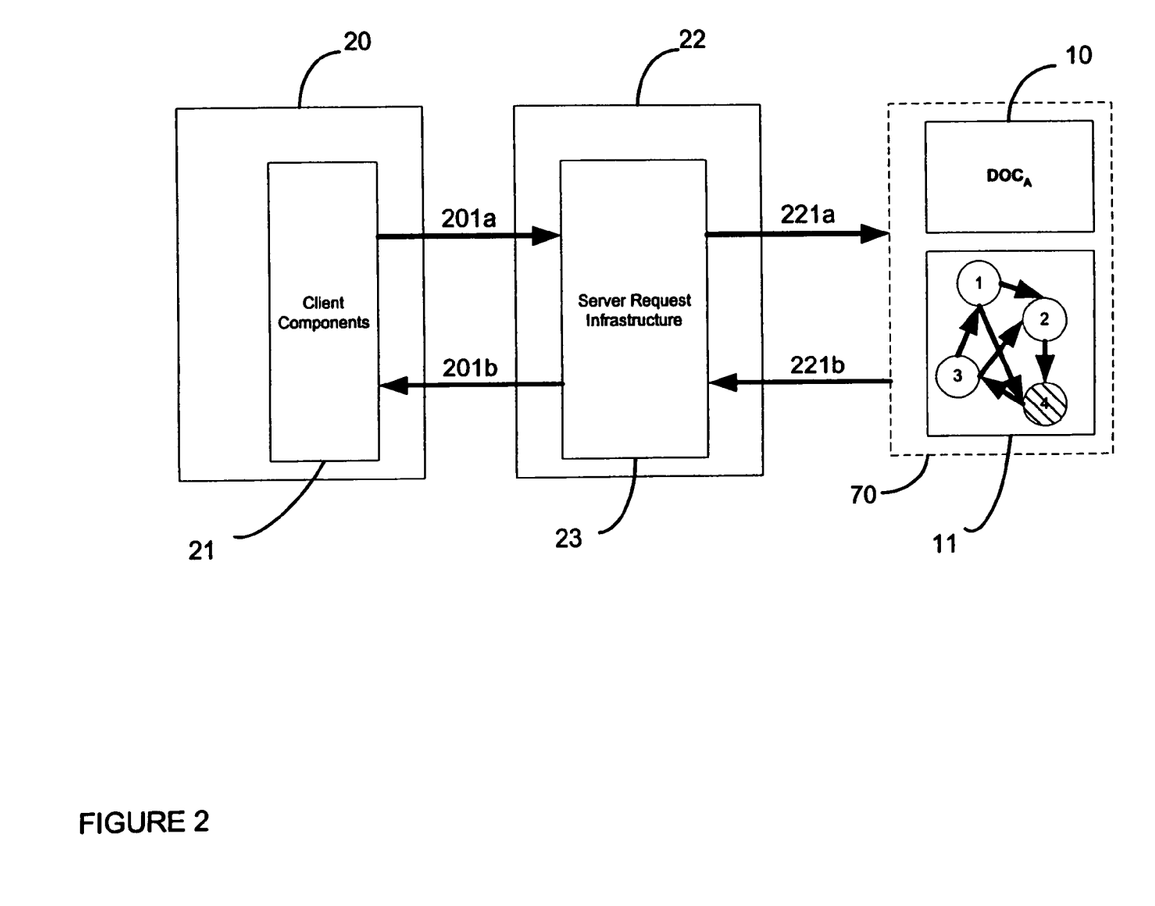
FIG. 2 is an illustration of the storage and retrieval of objects and state information in accordance with the invention.

Server 22 maintains objects and information necessary to control access to the object in object storage 70. FIG. 2 illustrates how client 20 interacts with the server 22 to access and manipulate an object 10. When a user of client computer 20 desires access to an object (e.g., $DOC_A$ client components 21 make a request 201a to server 22. Server 22 has a request infrastructure component 23 that accepts the request and retrieves (221a, 221b) the appropriate object 10 and/or object information 11 from object storage 70. Notably, the object information 11 comprises state information related to the potential states of the object (e.g., state 1, state 2, state 3, state 4), the current state of the object (e.g., shown here as cross-hatched state 40, and the possible state transitions (e.g., transition form state 4 to state 3). Some or all of this information 11 is transferred (201b) in connection with object 10 by server request infrastructure 23 back to client components 21 where the information can be process to give a user appropriate access to object 10.

According to an aspect of the invention, the operations that a given client 20, 20a may perform on object 10 are to some extent dictated by the information 11 associated with object 10. Thus, for example, in the illustrative example of FIG. 2 wherein the object 10 is in state 4, the object may only transition to state 3 as indicated by the state transition to state 3 from state 4 and the lack of any other transitions out of state 4. By maintaining the information 11 by server 22, any modifications to the information 11, such as the state model associated with the object 10, can be made by way of server 22 and dynamically delivered to client 20. In this way, the system is more flexible in that changes made in a central location (e.g. object store 70) are replicated to a plurality of clients. Moreover, client 20 does not need to understand in advance all of the allowed states and state transitions for a given object 10 (which may differ for different objects and different users) but rather obtains the information as needed for each object.

Figure 3:
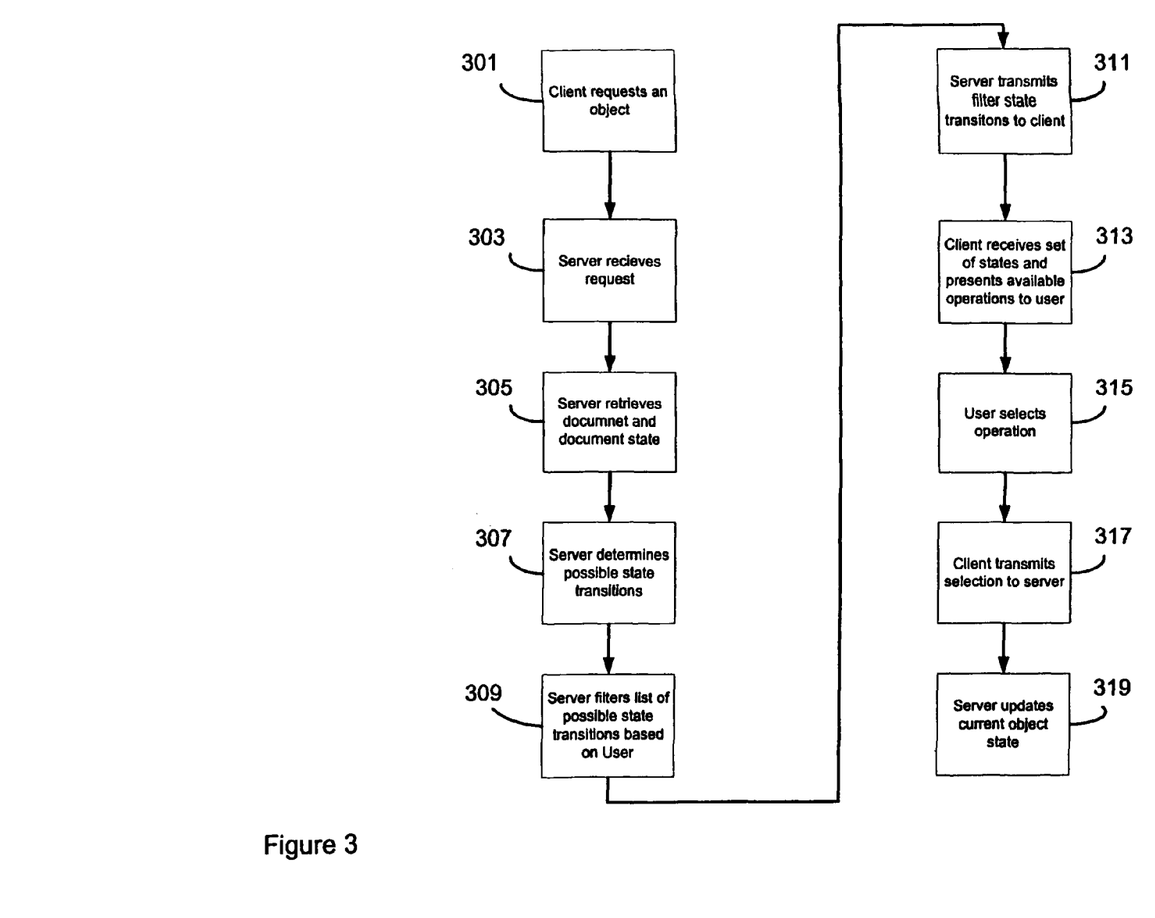
FIG. 3 is a flowchart illustrating the flow of control in client access to objects maintained by the server in accordance with the present invention.
Figure 4:
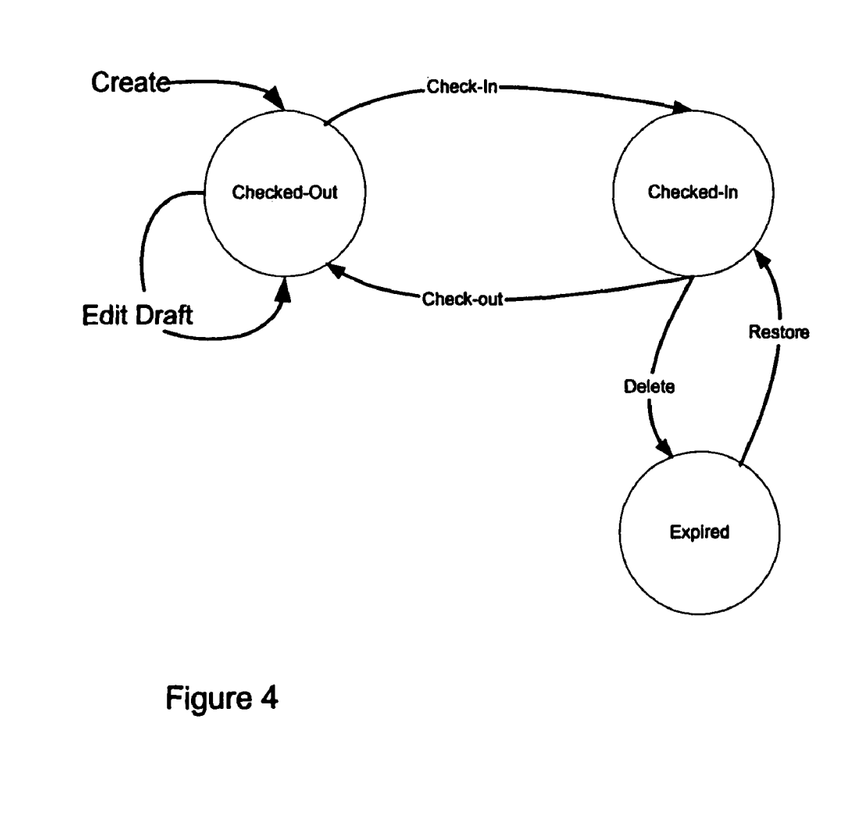
FIG. 4 is an exemplary state diagram that illustrates the transitions of a document between states in accordance with an aspect of the invention.

FIG. 3 is a flow chart that provides further detail of the process performed by client components 21 in conjunction with server request infrastructure 23 whereby client 20 accesses an object 10 and its related information (refer also to FIG. 2). Initially, a user makes a request for an object by way of a client computer 20. That request is processed by client component 21 (301). An exemplary format for carrying out the request would be, in the case of a request for $DOC_A$, for client 20 to send a command to server 22 of the format INVOKE $DOC_A$<operation>GetOpsAllowed</operation>. This request is received by server request infrastructure 23 (303). In response, server request infrastructure 23 retrieves $DOC_A$ from object storage 70 to determine the current state (305). The server request additionally retrieves the current set of state transitions for the object (307). For example, FIG. 4 illustrates an exemplary state transition diagram for a document management system. Using the example of state transitions of FIG. 4, the set of valid state transitions could be stored in a table of table of the form:

TABLE 1

Sample State Transitions

| From State | To State | Operation (Transition) Name | Credential |
|---|---|---|---|
| None | Checked-Out | Create | All |
| Checked Out | Checked-In | Check-In | Group A |
| Checked-In | Checked-Out | Check-Out | All |
| Checked-In | Expired | Delete | Group B |
| Expired | Checked-In | Restore | Group B |

From the set of all possible valid transitions, the presently valid transitions can be determined based on the current state. Thus for example, if $DOC_A$ is currently in a "Checked-In" state, the possible valid state transitions and thus operations are "Check-Out"and "Delete." Hence, this set of states could be returned to the user. However, in accordance with an aspect of the invention, the set of valid operations could be further filtered based on the user's credentials. For example, it may be the case that all users are not permitted to perform a "Delete" operation. Accordingly, the users credentials are examined and compared to the Credential required to perform the operation. So in the present example in order to perform the operation of "Delete," the user must have a credential available to users in Group B; whereas all users may merely "Check-Out" $DOC_A$ (309).

In accordance with another aspect of the invention, by storing the possible state transitions centrally, the operation (transition) name may be easily converted to a localized name. By merely examining the users language parameter, the operation name may be converted by the server before returning the operation name to the user.

After determining the set of valid operations, the server request infrastructure 23 returns the set of filtered operations to client components 21 (311). Continuing with the document management example, where $DOC_A$ is in a "Checked-In" state, in an exemplary embodiment the set of filtered operations returned to client components 21 may take the form of:

<Ops Allowed>
<Value>Check-Out</Value>
<Value>Delete>/Value>
</Ops Allowed>

Figure 5:
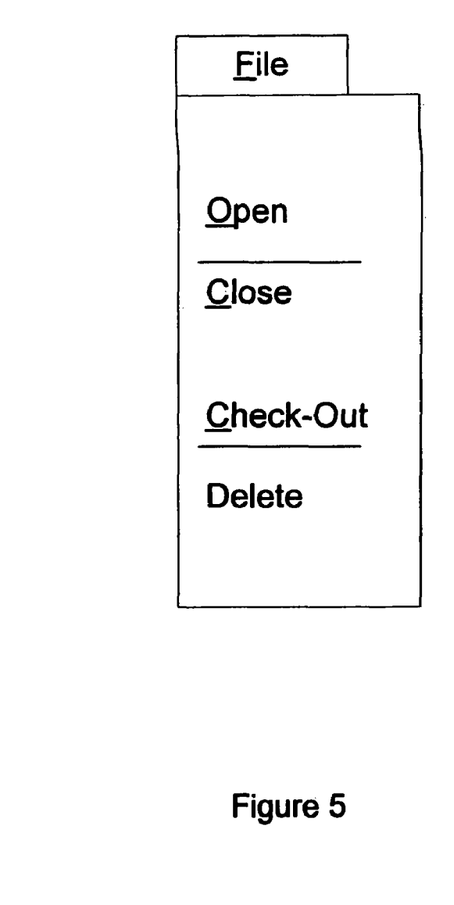
FIG. 5 is an illustration of the modification of a drop-down box to include allowed operations on an object in accordance with an aspect of the invention.

When client components 21 receives the set of operations allowed, the operations are presented to the user (313). FIG. 5 shows how a "File" drop-down box would display the available operations. If, for example, the user selected "Check-Out," the client components 21 would then transmit the selection back to server request infrastructure 23 (315). In an exemplary embodiment, the request would take the form of: INVOKE $DOC_A$ <operation>Check-Out</operation>. Server request infrastructure 23 would then update the current state of $DOC_A$.

Figure 6:
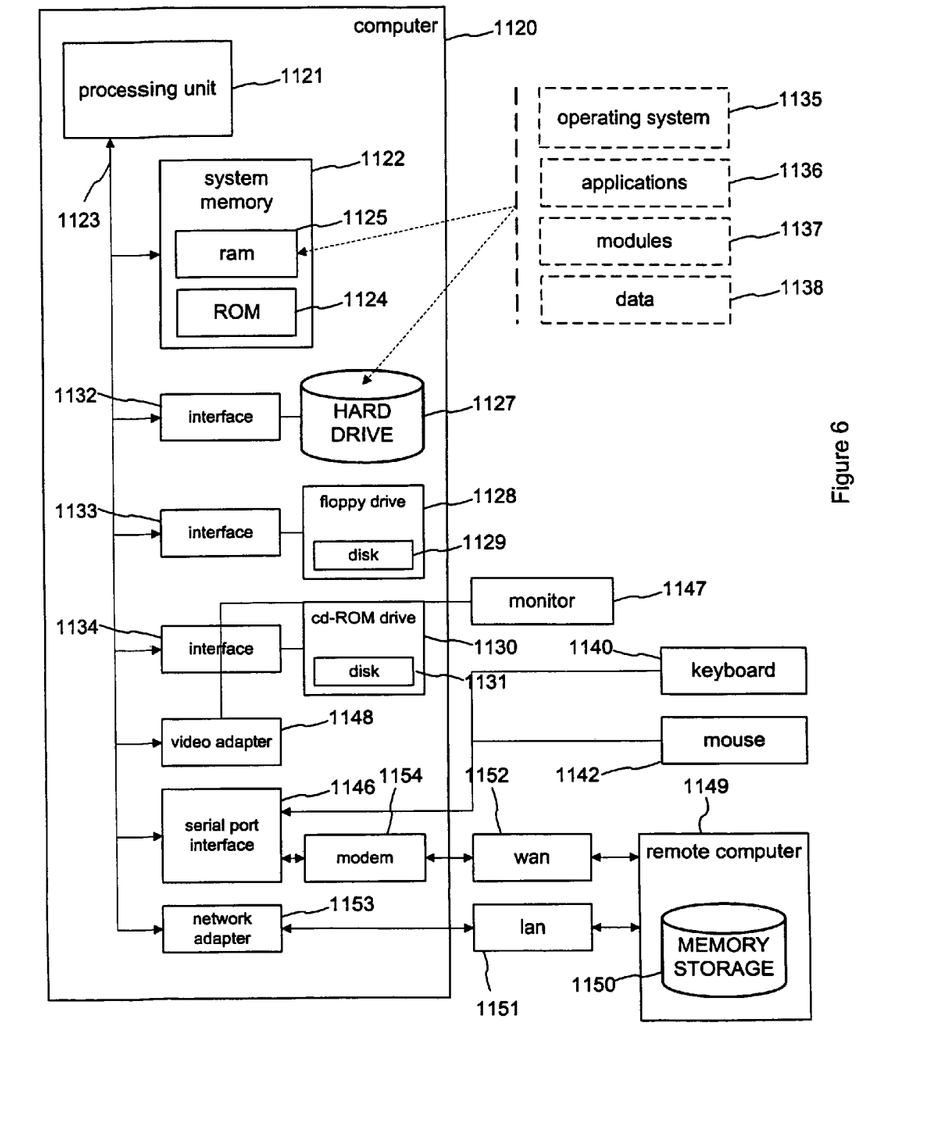
FIG. 6 is an illustrative computer system on which the software and methods of the present invention may be executed.

FIG. 6 illustrates an exemplary computing environment in which the program code that embodies the methods or system of the present invention may be executed. Those skilled in the art will appreciate that the invention may be practiced with other computer system configurations, including hand-held devices, multiprocessor system, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program code and program modules comprising program code may be located in both local and remote memory storage devices.

With reference to FIG. 6, an exemplary system for implementing the invention includes a general purpose computing device in the form of a conventional computer 1120, including a processing unit 1121, a system memory 1122, and a system bus 1123 that couples various system components including the system memory to the processing unit 1121. They system bus 1123 may be any of several types of bus structures including a memory bus or memory controller, a peripheral bus, and a local bus using any of a variety of bus architectures. The system memory includes read only memory (ROM) 1124 and random access memory (RAM) 1125. A basic input/output system 1126 (BIOS), containing the basic routines that help to transfer information between elements within the computer 1120, such as during start-up, is stored in ROM 1124. The computer 1120 further includes a hard disk drive 1127 for reading from and writing to a hard disk, not shown, a magnetic disk drive 1128 for reading from or writing to a removable optical disk 1131 such as a CD ROM or other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of computer readable instructions, data structures, program modules and other data for the computer 1120. Although the exemplary environment described herein employs a hard disk, a removable magnetic disk 1129 and a removable optical disk 1131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 1129, optical disk 1131, ROM 1124 or RAM 1125, including an operating system 1135, one or more application programs 1136, other program modules 1137, and program data 1138. A user may enter commands and information into the computer 1120 through input devices such as a keyboard 1140 and pointing device 1142. Other input devices (not shown) may include a microphone, joystick, game pad, satellite dish, scanner, or the like, These and other input devices are often connected to the processing unit 1121 through a serial port interface 1146 that is coupled to the system bus, but may be connected by other interfaces, such as a parallel port, game port of a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 may operate in a networked environment using logical connections to one or more remote computers, such as a remote computer 1149. The remote computer 1149 may be another computer, a server, a router, a network PC, a peer device or other common network node, and typically includes many or all of the elements described above relative to the computer 1120, although only a memory storage device 1150 has been illustrated in FIG. 6. The logical connections depicted in FIG. 6 include a local area network (LAN) 1151 and a wide area network (WAN) 1152. Such networking environments are commonplace in offices, enterprise-wide computer networks, intranets and the Internet.

When used in a LAN networking environment, the computer 1120 is connected to the local network 1151 through a network interface or adapter 1153. When used in a WAN networking environment, the computer 1120 typically includes a modem 1154 or other means for establishing communication over the wide area network 1152, such as the Internet. The modem 1154, which may be internal or external, is connected to the system bus 1123 via the serial port interface 1146. In a networked environment, program modules depicted relative to the computer 1120, or portions thereof, may be stored in the remote memory storage device. It will be appreciated that the network connections shown are exemplary and other means of establishing a communications link between the computers may be used.

While the invention is susceptible to various modifications and alternative constructions, certain illustrated embodiments have been shown in the drawings and accompanying detailed description. It should be understood, however, that there is no intention to limit the invention to the specific constructions disclosed herein. For example, while the primary example used throughout was described in connection with a document management system, the present invention is by no means limited to such a system, but could be useful in any system wherein textual, graphic, or other information is managed. As such, the invention is intended to cover all modification, alternative constructions, and equivalents falling within the scope and spirit of the invention.

What is claimed is:

1. A method for data object management comprising:
sending a request to a first computer from a second computer for a data object in a set of data objects, said first computer comprising for said object a set of object states in which said object may be maintained on the first computer, a set of transitions between object states, and a current object state in which said data object is maintained;

receiving from said first computer an indication of at least a subset of transitions between object states where said indication of said at least a subset of transitions between object states is based upon transitions out of the current object state and valid transitions from the current object state to another state;

presenting, to a user on a display of the second computer, operations capable of being performed on said data object where the operations are based on the subset of transitions between object states, and sending an indicator to the first computer to change the current state of the data object on the first computer to a selected state of the object states in the set of states based on the user of the second computer selecting an operation from the presented operations;

wherein the operations not capable of being performed on said data object are not available to the user.

2. The method as recited in claim 1 wherein the data objects comprise documents.

3. The method as recited in claim 1 further comprising receiving an indication of the subset states transitions as operations that may be performed upon the data object.

4. The method as recited in claim 1 further comprising presenting indication of the operations in accordance with a local language of the requestor.

5. The object management system as recited in claim 1 wherein the sending requests to the first computer is by way of a network.

6. The system according to claim 1 comprising a memory in electrical communication with said processor storing a set user credentials.

7. A computer-readable storage medium comprising:

computer-executable instructions for sending a request to a first computer from a second computer for data object in a set of objects, said first computer comprising for said data object a set of object states in which said data object may be maintained by said first computer, a set of transitions between object states, and a current object state;

computer-executable instructions for receiving from said first computer an indication of at least a subset of transitions between object states where said indication of said at least a subset of transitions between object states is based upon transitions out of the current object state and receiving valid transitions from the current state to another state; and computer-executable instructions for presenting to a user on a display of the second computer with operations capable of being performed on said object where the operations are based on the subset of transitions between object states; and computer-executable instructions for sending an indicator to change the current state of the at least one object on the first computer to a selected state of the object states in the set of states based on the user of the second computer selecting an operation from the presented operations;

wherein the operations not capable of being performed on said data object are not available to the user.

8. The computer-readable medium according to claim 7, further comprising computer-executable instructions for transmitting indication of the subset states transitions as operations that may be performed upon the data object.

9. The computer-readable medium according to claim 7, further comprising computer-executable instructions for presenting indication of the operations in accordance with a local language of the requestor.

10. The computer-readable medium according to claim 7 wherein the indicator comprises a tag indicating an operation is to be performed and information indicative of the object name.

11. The computer-readable medium as recited in claim 7 further comprising maintaining a set of states in a table of states and associated valid state transitions that are associated with the data object.

12. A system comprising:

a processor;

a communications device in communication with said processor and capable of connecting to a network;

a memory in electrical communication with said processor storing a set of computer-executable instructions for sending a request by way of the communications device to a first computer from a second computer for a data object in a set of objects, said first computer comprising for said data object a set of object states in which said data object may be maintained by said first computer, a set of transitions between object states, and a current object state;

a memory in electrical communication with said processor storing a set of computer-executable instructions for receiving from said first computer by way of the communications device an indication of at least a subset of transitions between object states where said indication of said at least a subset of transitions between object states is based upon transitions out of the current object state and receiving valid transitions from the current state to another state; and a display device coupled to said processor for presenting a user on a display of the second computer with operations capable of being performed on said data object where the operations are based on the subset of transitions between object states; and a memory in electrical communication with said processor storing a set of computer-executable instructions for sending an indicator to change the current state of the at least one object on the first computer to a selected state of the object states in the set of states where the selected state based on the user of the second computer selecting one of the operations being performed on said data object;

wherein the operations not capable of being performed on said data object are not available to the user.

13. The system according to claim 12, wherein the display presents only valid operations capable of being performed on the data object.

14. The system according to claim 12 wherein the indication of at least a subset of transitions between object states comprises a tag indicating the transition between states.

15. The system according to claim 14 wherein the tag comprises an tag.

16. The system according to claim 14 wherein the operations capable of being performed are presented in a drop down box.

* * * * *